Reissued Feb. 24, 1948

Re. 22,977

UNITED STATES PATENT OFFICE 22,977

BLEACHING BATH AND PROCESS FOR BLEACHING COLOR FILM

Frank J. Kaszuba, Binghamton, N. Y., assignor to General Aniline & Film Corporation, New York, N. Y., a corporation of Delaware No Drawing. Original No. 2,419,900, dated April 29, 1947, Serial No. 627,527, November 8, 1945. Application for reissue July 11, 1947, Serial No. 760,517

17 Claims. (Cl. 95—88)

This invention relates to photographic bleaching baths, to such baths employed in multicolor photography, and especially to baths for the bleaching of the silver image in a multicolor film following color-forming development.

It is known that in the processing of multicolor reversal film and multicolor negative film, the silver present in all the layers following development is converted into a salt by any of the well-known silver-salt formers, commonly known as bleaching baths, and the silver-salt thus formed is then removed by dissolving it in a silver-salt solvent such as, for example, hypo. In certain color photographic emulsions containing an organic solvent for color-couplers, such as a water-insoluble but water permeable cellulose binder or a high-boiling crystalloidal material as described in United States Patents 2,304,940 and 2,322,027, respectively, there is a tendency for these solvents to occlude the metallic silver following development and to prevent its conversion into a silver salt by the customary bleaching bath. In the processes described in these patents, the coupler originally present in the emulsion layer and the dye formed from it are dissolved in globules of the organic solvent which traps or wets the particles of metallic silver as it is formed during the development step and then encloses portions of it which can no longer be affected by the bleaching bath. In order to obviate this difficulty, it has been proposed in United States Patent 2,378,265 to incorporate into a bleach bath an organic solvent such as a monohydroxy alcohol or an aliphatic ketone. These solvents permit the bleach bath to penetrate any organic material in the emulsion so that the bleach bath is able to act on the metallic silver formed therein during development.

It has been found that in removing metallic silver from multicolor photographic layers, which are prepared by the direct dispersion of color-formers fast to diffusion in silver-halide emulsions as disclosed in United States Patents 2,179,228; 2,179,238–9; 2,179,234; 2,178,612; 2,179,244; 2,186,719; 2,186,851–2; 2,186,732–3–4; 2,186,849; 2,186,045; 2,200,306; 2,280,722; 2,292,575; 2,303,928; and 2,307,399, bleaching baths containing the monohydroxy alcohols and aliphatic ketones are inoperative since some of the silver is not oxidized and, consequently, is not removed. The unremoved silver not only imparts a hazy effect to the color film, but also results in poor color rendition. Moreover, the unremoved silver has a deteriorating action upon the layers in which it is located with the result that even the poor color rendition is finally obliterated.

An object of the present invention is to provide solutions for the removal of metallic silver from multicolored photographic layers.

A further object is to provide a method and means for the complete removal of metallic silver from silver-halide emulsion layers containing dispersed color-formers fast to diffusion.

Other objects and features of the invention will become apparent as the description proceeds.

I have found that the above objects are accomplished by incorporating into a bleach solution commonly known and used in color photography, a phenoxy alcohol represented by the following general formulae:

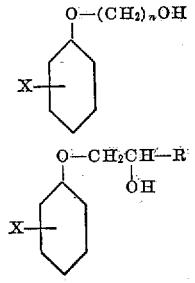

wherein R is an alkyl group, such as methyl, ethyl, propyl, and the like, X represents either hydrogen, an alkyl of the same value as R or a halogen, such as bromine or chlorine, and $n$ represents a positive integer of from 1 to 3.

This discovery makes it possible to enable the bleach bath to oxidize all of the metallic silver in the developed color film, and to permits its complete removal from the photographic layers. Furthermore, it has been found that such alcohols may be utilized in the bleaching of silver from any color film whether the dyestuff images be formed while employing the color-formers in the layer or while forming the dyestuff images by the methods known as the "controlled diffusion method" or the "selected second exposure and color development method," as disclosed in United States Patents 1,897,866; 1,900,870; 1,928,709 and 1,980,941. In the latter cases, better results are often achieved when using bleaching baths containing these alcohols than when using the monohydroxy alcohols and aliphatic ketones referred to in United States Patent 2,378,265. The invention is accordingly generic to the removal of silver from any photographic color film where the dyestuff images are produced by color-forming development.

The concentration of the phenoxy alcohol required may vary considerably. For instance, as little as 5 grams per liter of bleach solution has been found to effect the complete conversion of metallic silver into a silver-salt soluble in the usual silver-salt solvent, and as much as 20 grams per liter can be used without interference with the properties of the bleaching solution. Amounts higher than 20 grams per liter can be employed, but the concentration actually employed should not exceed the solubility limits of the alcohol selected. For practical purposes, however, concentrations ranging from between 5 and 15 grams per liter are most desirable. These alcohols are readily removed in the subsequent washing of the film and do not leave oily slicks on the surface, nor do they effect the film base in any way.

The following are examples of phenoxy alcohols employed in accordance with the present invention:

(1)

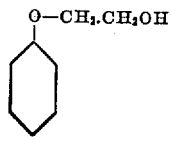

β-phenoxyethanol (2)

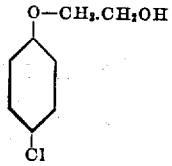

β-(p-chlorophenoxy) ethanol (3)

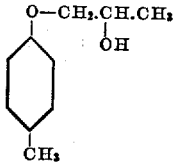

1 (p-methylphenoxy)-propanol-2

(4)

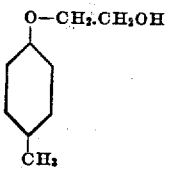

β-(p-methyl phenoxy)-ethanol (5)

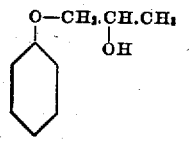

1-phenoxy propanol-2

(6)

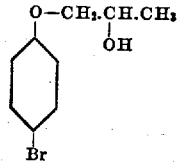

1-(p-bromophenoxy)-propanol-2

(7)

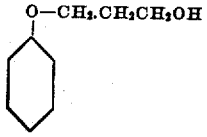

β-phenoxypropanol

The compounds and homologues thereof are prepared according to the method of A. J. Shukis et al., J. A. C. S., 66, page 1461, 1944.

As is well known, all bleach solutions contain an oxidizing agent dissolved in a suitable solvent, such as, for example, water, with or without the presence of other adjuvants. A typical bleach solution consists of 100 grams of an oxidizing agent per liter of solution, and may contain one or more of the following ingredients:

| | | |
|---|---|---|
| Potassium bromide (converting agent) | grams | 10 |
| Disodium phosphate (buffering salt) | do | 40 |
| Sodium bisulfate (buffering salt) | do | 5 |
| Sodium tetraphosphate (corrosion preventive) | grams | 20 |
| Water to make up (solvent) | liter | 1 |

By an oxidizing agent I mean an inorganic chemical compound that will oxidize a metallic silver image to form a silver-salt. Most commonly used oxidizing agents are alkali metal ferricyanides, such as sodium, potassium, ammonium ferricyanides, the alkali metal persulfates, i. e., the sodium and potassium persulfates, or mixtures of these salts.

By a converting agent I mean a chemical compound such as potassium bromide or sodium thiocyanate which by reason of a difference in solubility will replace the silver ferrocyanide formed in the bleaching reaction (when ferricyanide is used as the oxidizing agent) to form silver bromide or silver thiocyanate and thus impel the bleaching reaction to go to completion. Converting agents are sometimes called halogenizing agents.

By buffering agents I mean any substance that is added to bring the bleach solution to a specified pH and to maintain this pH even though small amounts of acids or alkali may be carried into the bleach by the film. The pH's used in bleaching color films are generally maintained between 3 and 9.

By corrosion preventive I refer to those compounds which retard the corrosive effect of the bleach solution on developing tanks, trays, etc. Large quantities (20–80 grams per liter) of alkali metal phosphates such as disodium phosphate, sodium tetraphosphate, and the like, have been found to do this effectively as well as dialkyl amino alcohols as described in United States Patent 2,327,813.

By solvent I refer to the liquid in which the above materials are dissolved which is usually water.

The following examples describe in detail methods for accomplishing the above objects, but it is to be understood that they are inserted merely for purposes of illustration and are not to be construed as limiting the scope of the invention.

*Example I*

Two exposed 4" x 5" multilayer color film sheets, of the reversal type and containing color-formers fast to diffusion, were processed as follows:

First development for 10 minutes at 68° F. in a developer of the following composition:

| | | |
|---|---|---|
| P-monomethylamino-phenol sulfate | grams | 2 |
| Sodium sulfite | do | 20 |
| Hydroquinone | do | 4 |
| Sodium carbonate | do | 80 |
| Sodium thiocyanate | do | 5 |
| Potassium bromide | do | 4 |
| Water to make up | liter | 1 |

Short stopped for 3 minutes in a 3% aqueous solution of acetic acid.

Washed for 2 minutes in running water.

Second exposure for 3 minutes to light of a No. 1 photo-flood lamp 30 inches away from the film.

Color development for 15 minutes in a developer of the following composition:

| | | |
|---|---|---|
| Sodium sulfite | grams | 5 |
| p-Amino diethyl aniline HCl | do | 4 |
| Sodium carbonate | do | 40 |
| Potassium bromide | do | 1 |
| Water to make up | liter | 1 |

Rinsed for 1 minute in running water.

Hardened for 5 minutes in a 3% aqueous solution of chrome alum.

Washed for 5 minutes in running water.

The first washed film was treated in solution No. 1 and the second washed film was treated in solution No. 2 of the following compositions:

| | | No. 1 | No. 2 |
|---|---|---|---|
| Disodium monopotassium ferricyanide | grams | 100 | 100 |
| Potassium bromide | do | 10 | 10 |
| Sodium tetraphosphate | do | 20 | 20 |
| Disodium phosphate | do | 40 | 40 |
| Sodium bisulfate | do | 25 | 25 |
| β-phenoxyethanol | do | ------- | 10 |
| Water to make up | liter | 1 | 1 |

The two bleached film sheets were then washed in water for 5 minutes, fixed for 5 minutes in a 20% aqueous hypo solution, washed for an additional 5 minutes and then dried. The film bleached in solution No. 1 showed objectionable haziness due to the presence of metallic silver in the layers, whereas the film bleached in solution No. 2 containing β-phenoxyethanol was clear and of the desired color rendition.

*Example II*

Two exposed 4" x 5" multilayer color film sheets of the negative type and containing color-formers fast to diffusion were processed as follows:

Developed for 10 minutes at 68° F. in a developer of the following composition:

| | | |
|---|---|---|
| Sodium sulfite | grams | 0.5 |
| 2-amino-5-diethylaminotoluene hydrochloride | grams | 2.5 |
| Hydroxylamine HCl | do | 1 |
| Sodium carbonate | do | 65 |
| Potassium bromide | do | 2.5 |
| Water to make up | liter | 1 |

Short stopped for 5 minutes in a solution of the following composition:

| | | |
|---|---|---|
| Monopotassium phosphate | grams | 80 |
| Disodium phosphate | do | 20 |
| Water to make up | liter | 1 |

Hardened for 3 minutes in a 3% chrome alum solution.

Washed for 5 minutes in running water.

The first washed film was treated in solution No. 1 and the second washed film was treated in solution No. 2 of the following compositions:

| | | No. 1 | No. 2 |
|---|---|---|---|
| Potassium ferricyanide | grams | 100 | 100 |
| Disodium phosphate | do | 4.3 | 4.3 |
| Monopotassium phosphate | do | 5.8 | 5.8 |
| Potassium bromide | do | 10 | 10 |
| 1-(p-bromophenoxy)-propanol-2 | do | ------- | 10 |
| Water to make up | liter | 1 | 1 |

The two bleached sheet films were then washed for 5 minutes, fixed for 5 minutes in a 20% aqueous solution of hypo, washed an additional 15 minutes and then dried. As in Example I, the film bleached in solution No. 1, containing no 1-(p-bromophenoxy)-propanol-2 showed considerable haziness, whereas the film bleached in solution No. 2 was clear and of the desired color rendition.

*Example III*

Example I was repeated with the exception that the bleach bath No. 2 contained 10 grams of β-phenoxypropanol instead of β-phenoxyethanol. The film bleached in the solution containing no β-phenoxypropanol showed objectionable haziness, while the film bleached with the solution containing β-phenoxy-propanol was clear and of the desired color rendition.

The above specific examples are to be regarded as merely illustrative of the invention, and not in any sense restrictive. It will be obvious to anyone skilled in the art that many modifications such as substituting equivalent materials and varying the proportions of materials used are within the spirit and scope of the invention as defined in the appended claims.

I claim:

1. In a process of color photography the method of removing silver from the film after dyestuff image formation by the action of a bleaching bath which comprises treating said film with such a bath containing a phenoxy alcohol selected from the class consisting of those corresponding to the following formulae:

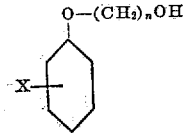

and

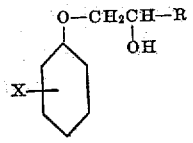

wherein R is alkyl, X is a member selected from the class consisting of hydrogen, alkyl, and halogen, and $n$ is a positive integer of from 1 to 3.

2. In a process of color photography the method of removing silver from a color film containing dyestuff images which are produced by color-forming development of an emulsion containing a dyestuff former fast to diffusion, the improvement which comprises subjecting said film to the action of a bleaching bath containing a phenoxy alcohol selected from the class consisting of those corresponding to the following formulae:

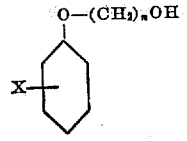

and

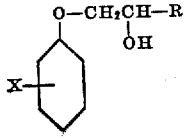

wherein R is alkyl, X is a member selected from the class consisting of hydrogen, alkyl, and halogen, and $n$ is a positive integer of from 1 to 3.

3. In a process of color photography the method of removing silver from a color film containing dyestuff images which are produced by color-forming development of an emulsion containing a dyestuff former fast to diffusion, the improvement which comprises subjecting said film to the action of a bleaching bath containing β-phenoxyethanol.

4. In a process of color photography the method of removing silver from a color film containing dyestuff images which are produced by color-forming development of an emulsion containing a dyestuff former fast to diffusion, the improvement which comprises subjecting said film to the action of a bleaching bath containing 1-(p-methylphenoxy)-propanol-2.

5. In a process of color photography the method of removing silver from a color film containing dyestuff images which are produced by color-forming development of an emulsion containing a dyestuff former fast to diffusion, the improvement which comprises subjecting said film to the action of a bleaching bath containing β-phenoxypropanol.

6. In a process of color photography the method of removing silver by the action of a bleaching bath which comprises adding to said bath β-phenoxyethanol.

7. In a process of color photography the method of removing silver by the action of a bleaching bath which comprises adding to said bath 1-(p-methylphenoxy)-propanol-2.

8. In a process of color photography the method of removing silver by the action of a bleaching bath which comprises adding to said bath β-phenoxypropanol.

9. The method according to claim 1 wherein the concentration of the phenoxy alcohol ranges from 5 to 20 grams per liter of bleach.

10. A photographic bleaching bath comprising an aqueous solution of an inorganic oxidizing agent and a phenoxy alcohol selected from the class consisting of those corresponding to the following formulae:

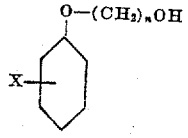

and

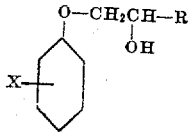

wherein R is alkyl, X is a member selected from the class consisting of hydrogen, alkyl, and halogen, and $n$ is a positive integer of from 1 to 3.

11. A photographic bleaching bath comprising an aqueous solution of an inorganic oxidizing agent and β-phenoxyethanol.

12. A photographic bleaching bath comprising an aqueous solution of an inorganic oxidizing agent and 1-(p-methylphenoxy)-propanol-2.

13. A photographic bleaching bath comprising an aqueous solution of an inorganic oxidizing agent and β-phenoxypropanol.

14. In a process of producing photographic color images in a silver-halide emulsion by color-forming development in which silver images produced in the process are removed by the action of a bleaching bath applied subsequent to the color development step, the improvement which comprises removing the silver by the action of a bleaching bath containing a phenoxy alcohol selected from the class consisting of those corresponding to the following formulae:

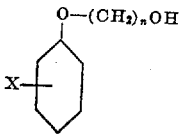

and

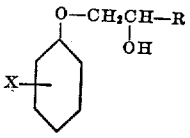

wherein R is alkyl, X is a member selected from the class consisting of hydrogen, alkyl, and halogen, and $n$ is a positive integer of from 1 to 3.

15. In a process of producing photographic color images in a silver-halide emulsion by color-forming development in which silver images produced in the process are removed by the action of a bleaching bath applied subsequent to the color development step, the improvement which comprises removing silver by the action of a bleaching bath containing β-phenoxyethanol.

16. In a process of producing photographic color images in a silver-halide emulsion by color-forming development in which silver images produced in the process are removed by the action of a bleaching bath applied subsequent to the color development step, the improvement which comprises removing silver by the action of a bleaching bath containing 1-(p-methyl-phenoxy)-propanol-2.

17. In a process of producing photographic color images in a silver-halide emulsion by color-forming development in which silver images produced in the process are removed by the action of a bleaching bath applied subsequent to the color development step, the improvement which comprises removing silver by the action of a bleaching bath containing β-phenoxypropanol.

FRANK J. KASZUBA.